United States Patent
Shida

(10) Patent No.: US 8,923,908 B2
(45) Date of Patent: Dec. 30, 2014

(54) DISTRIBUTED ANTENNA SYSTEM

(75) Inventor: Masaaki Shida, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 727 days.

(21) Appl. No.: 13/183,270

(22) Filed: Jul. 14, 2011

(65) Prior Publication Data

US 2012/0308238 A1  Dec. 6, 2012

(30) Foreign Application Priority Data

Jun. 3, 2011  (JP) ................................ 2011-124780

(51) Int. Cl.
  *H04B 7/00*  (2006.01)
  *H04B 1/40*  (2006.01)
  *H04L 5/00*  (2006.01)

(52) U.S. Cl.
  CPC ................ H04B 1/40 (2013.01); *H04L 5/0023* (2013.01); *H04L 5/001* (2013.01)
  USPC ........... 455/517; 455/13.3; 455/19; 455/63.4; 455/501; 343/853; 370/328; 375/267; 375/299

(58) Field of Classification Search
  CPC . H04M 1/7253; B60R 25/245; H03G 3/3036; H04W 52/52; H04W 88/04; H04B 7/022; H04B 7/0452; H04B 7/0626
  USPC ........ 455/517, 13.3, 19, 63.4, 69, 277.1, 500, 455/501, 513, 550.1, 553.1; 343/700 R, 343/853; 370/328, 334; 375/267, 299
  See application file for complete search history.

(56) References Cited

U.S. PATENT DOCUMENTS

| | | |
|---|---|---|
| 8,472,963 B2 | 6/2013 | Caire |
| 2002/0011954 A1* | 1/2002 | Judd et al. ............. 343/700 MS |
| 2010/0040006 A1 | 2/2010 | Caire |

FOREIGN PATENT DOCUMENTS

| | | |
|---|---|---|
| JP | 6-90198 (A) | 3/1994 |
| JP | 2000-23238 (A) | 1/2000 |
| WO | WO 2010/019610 A1 | 2/2010 |

OTHER PUBLICATIONS

IEEE COM MAG, "Carrier Aggregation for LTE-Advanced Mobile Communication Systems" Feb. 2010, pp. 88-93.
Research in Motion, UK Limited, Support of Carrier Aggregation with Heterogeneous Network Deployment, 3GPP TSG-RAN WG1 Meeting #58b, Oct. 12, 2009, R1-094112.
Japanese Office Action dated Jul. 8, 2014 with an English Translation thereof.

* cited by examiner

*Primary Examiner* — Shaima Q Aminzay
(74) *Attorney, Agent, or Firm* — McGinn IP Law Group, PLLC

(57) ABSTRACT

A distributed antenna system includes a first antenna disposed covering a predetermined communication range, the first antenna carrying out a communication at least at a low-frequency band, and a plurality of second antennas disposed covering the predetermined communication range, the plurality of second antennas carrying out a communication at a high-frequency band. The distributed antenna system is operable to carry out a communication between the first antenna and the second antennas, and a mobile terminal located within the predetermined communication range by means of carrier aggregation using the low-frequency band and the high-frequency band. The distributed antenna system further includes a BB module equipped in a base station for carrying out a communication within the predetermined communication range, the first antenna and the second antennas being each connected to the one BB module via an RF module.

6 Claims, 4 Drawing Sheets

21a WIRELESS SYSTEM FOR 800 MHz BAND
21b WIRELESS SYSTEM FOR 2 GHz BAND

DISTRIBUTED ANTENNA SYSTEM

The present application is based on Japanese patent application Nos. 2010-128629 and 2011-124780 filed on Jun. 4, 2010 and Jun. 3, 2011, respectively, the entire contents of which are incorporated herein by reference.

BACKGROUND OF THE INVENTION

1. Field of the Invention

This invention relates to a distributed antenna system for carrying out a communication between an antenna and a mobile terminal by means of carrier aggregation using a low-frequency band and a high-frequency band.

2. Description of the Related Art

In a mobile communication system, there are a base station and a mobile terminal that use plural frequency bands such as 800 MHz band and 2 GHz band.

As shown in FIG. 4, in the base station using the plural frequency bands, a wireless system 21a for the 800 MHz band and a wireless system 21b for the 2 GHz band are connected to a single antenna 20. The wireless systems 21a, 21b are respectively equipped with RF modules 22a, 22b and BB modules 23a, 23b. In each of the RF modules 22a, 22b, a radio frequency (RF) signal handled at the antenna 20 and a base band (BB) signal handled at the BB modules 23a, 23b are mutually converted.

In the mobile communication system, for example, a communication is normally carried out by using the 800 MHz band, and when the 800 MHz band is crowded, the communication is carried out by that the used frequency is switched to the 2 GHz band.

The switch of frequency band is carried out by switching to the wireless system 21a or the wireless system 21b, namely to any one of the wireless system 21a for the 800 MHz band and the wireless system 21b for the 2 GHz band as the situation demands.

By the way, different frequency bands have different transmission loss, and a radio wave of the 2 GHz band of high-frequency band has a narrower communication range than a radio wave of the 800 MHz band of low-frequency band, so that in particular, it is difficult for the high-frequency band to reach cell edges of the communication range of low-frequency band.

Thus, a distributed antenna system has been developed, the antenna system having a configuration that plural antennas for the high-frequency band are disposed so as to cover a communication range of the low-frequency band, thereby a communication can be carried out anywhere within a predetermined communication range at both of the low-frequency band and high-frequency band.

The plural antennas for the high-frequency band are disposed in such a way that first a base station is respectively installed in each place, and the antennas for the high-frequency band are connected to BB modules of each base station via RF modules.

JP-A-2000-23238 and JP-A-H6-90198 disclose a communication system that includes a base station of a wide communication range and plural base stations of a narrow communication range covering the wide communication range, and selects any one of the base station of a wide communication range and the base station of a narrow communication range in accordance with the communication speed and moving speed of the mobile body.

SUMMARY OF THE INVENTION

At present, in the standardization by 3GPP that is a standard-setting organization, a technology of carrier aggregation (CA) has been in discussion (for example, refer to IEEE COM MAG, "Carrier Aggregation for LTE-Advanced Mobile Communication Systems" February, 2010 as a NPL). The carrier aggregation means a technology that pursues an enhancement of throughput by securing band frequencies across plural frequency bands and using them at the same time.

In order to carry out a communication by means of the carrier aggregation, it is needed to handle plural frequency bands at the same time, however, each antenna is connected to BB module of different base station respectively, thereby collaboration between the base stations is not achieved, thus it is difficult to carry out the communication by means of the carrier aggregation in the conventional distributed antenna system.

For adapting to the carrier aggregation, one may consider developing a new distributed antenna system adapted hereto, but this consideration allows the waste of the existing equipments.

Accordingly, it is an object of the invention to provide a distributed antenna system that can be used to perform a communication between an antenna and a mobile terminal by means of the carrier aggregation using a low-frequency band and a high-frequency band only by making a small modification to the existing equipments.

(1) According to one embodiment of the invention, a distributed antenna system comprises:

a first antenna disposed covering a predetermined communication range, the first antenna carrying out a communication at least at a low-frequency band; and a plurality of second antennas disposed covering the predetermined communication range, the plurality of second antennas carrying out a communication at a high-frequency band, wherein the distributed antenna system is operable to carry out a communication between the first antenna and the second antennas, and a mobile terminal located within the predetermined communication range by means of carrier aggregation using the low-frequency band and the high-frequency band, and the distributed antenna system further comprises a BB module equipped in a base station for carrying out a communication within the predetermined communication range, the first antenna and the second antennas being each connected to the one BB module via an RF module.

In the above embodiment (1) of the invention, the following modifications and changes can be made.

(i) The RF module and the BB module are connected to each other by an optical fiber.

(ii) The communication by means of the carrier aggregation is carried out such that the BB module collectively processes signals of the low-frequency band and the high-frequency band.

(iii) The BB module comprises a L2/L3 processing part and a plurality of base band processing parts parallel connected to the L2/L3 processing part, the L2/L3 processing part outputs a transmitted data inputted thereto to a base band processing part selected from the plurality of base band processing parts based on a communication condition, and the selected base band processing part modulates the transmitted data inputted from the L2/L3 processing part, and transmits the modulated transmitted data as a base band signal to the RF module.

(iv) The communication condition includes at least one selected from a priority of the transmission data, the number of the plurality of second antennas, the number of the RF module, information of a frequency band corresponding to the first antenna, the plurality of second antennas and the RF module, information of an antenna with which the mobile terminal is capable of communicating and the RF module connected to the antenna, and information of a channel at the corresponding frequency band.

(v) The number of the plurality of base band processing parts is the same as or more than that of the RF module connected to the BB module.

(vi) The L2/L3 processing part transmits the transmitted data to the mobile terminal by using the plurality of base band processing parts connected to the RF module corresponding to a different frequency.

Points of the Invention

According to one embodiment of the invention, a distributed antenna system is constructed such that a first antenna and a second antennas disposed at each place are intensively connected to a single BB module via respective antennas RF modules, so that base band signals from the respective antennas are collectively processed by the single BB module. Thereby, the distributed antenna system can use simultaneously plural frequency bands so as to perform communications by means of the carrier aggregation.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Figure 1:
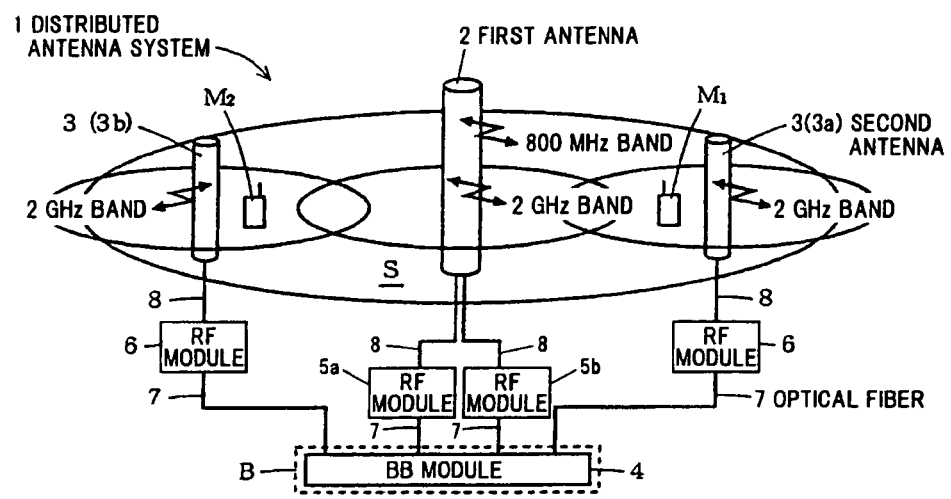
FIG. 1 is a conceptual view schematically showing a distributed antenna system according to one embodiment of the present invention.

The preferred embodiments according to the invention will be explained below referring to the drawings.

First, the carrier aggregation will be explained.

Figure 5A:
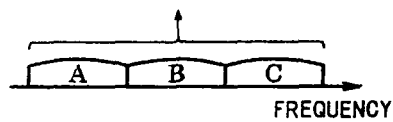
FIG. 5A is an explanatory view schematically showing carrier aggregation.
Figure 5B:
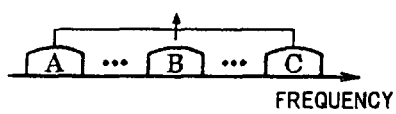
FIG. 5B is an explanatory view schematically showing carrier aggregation.

The carrier aggregation includes a method that carriers of continuous frequency bands A, B and C are used at the same time as shown in FIG. 5A and a method that carriers of discontinuous frequency bands A, B and C are used at the same time as shown in FIG. 5B.

It is an object of any of the above-mentioned methods to pursue an enhancement of throughput by securing band frequencies across plural frequency bands and using them at the same time. In the carrier aggregation, frequency bands are secured across plural frequency bands, thus collaboration of signal processing between frequency bands is essential.

However, the current distributed antenna system has only a configuration that plural antennas for high-frequency band are disposed in a base station installed in each place so as to cover a communication range of an antenna for low-frequency band, thereby frequency bands to be used can be switched within a predetermined communication range as the situation demands. Namely, in the carrier aggregation proposed in recent years, plural frequency bands are used at the same time, but in the current distributed antenna system, although plural frequency bands can be switched to be used, plural frequency bands cannot be used at the same time.

The reason is that BB module is respectively installed in the base station installed in each place, and an antenna for high-frequency band is connected to the BB module via RF module, thus the respective BB modules in each base station are different from each other, consequently the BB modules cannot collaborate with each other.

After a great deal of earnest study and deep consideration, the inventors have achieved the present invention of a distributed antenna system that utilizes the existing configuration and simultaneously corresponds to the carrier aggregation.

FIG. 1 is a conceptual view schematically showing a distributed antenna system according to one embodiment of the present invention.

A new distributed antenna system 1 proposed by the inventors includes a first antenna 2 disposed so as to cover a predetermined communication range S, and carrying out a communication at both of a low-frequency band and a high-frequency band and plural second antennas (antennas for high-frequency band) 3 disposed so as to cover the predetermined communication range S, and carrying out a communication at a high-frequency band. This configuration is similar to the conventional distributed antenna system and it is not needed to develop new equipments. Further, in FIG. 1, the second antennas 3 are shown as only two antennas 3a, 3b for the sake of simplification. In addition, in the embodiment, the first antenna 2 carries out a communication at both of a low-frequency band and a high-frequency band, but it is only necessary to carry out a communication at least at a low-frequency band.

The first antenna 2 is configured to be capable of carrying out a communication at both of a low-frequency band (for example, 800 MHz band) and a high-frequency band (for example, 2 GHz band). Thus, a RF module 5a for low-frequency band and a RF module 5b for high-frequency band are connected to the first antenna 2. Further, the first antenna 2 can be an antenna for low-frequency band that carries out a communication only at a low-frequency band.

The second antennas 3 are disposed in plural locations so as to cover the communication range of the low-frequency band of the first antenna 2. For example, in case that the low-frequency band is 800 MHz band and the high-frequency band is 2 GHz band, the communication range (area available for communication) of the low-frequency band is four times wider than the communication range (area available for communication) of the high-frequency band, thus the plural second antennas 3 are disposed so as to cover the whole of the communication range (area available for communication) of the low-frequency band. A RF module 6 for high-frequency band is respectively connected to each of the second antennas 3.

Each of antennas 2, 3 and each of RF modules 5a, 5b, 6 are connected to each other by a coaxial cable 8, and each of RF modules 5a, 5b, 6 is located adjacent to (just below) each of antennas 2, 3 so as to reduce deterioration of signal.

The distributed antenna system 1 is configured so as to carry out a communication by means of the carrier aggregation using a low-frequency band and a high-frequency band between the first antenna 2 and the second antennas 3, and a mobile terminal $M_1$ or $M_2$ located within a predetermined communication range S, and has a feature that a BB module 4 is included, the BB module 4 being installed in a base station B that carries out a communication within the predetermined communication range S, and the first antenna 2 and the second antennas 3 are respectively connected to one BB module 4 via RF modules 5a, 5b, 6. The RF modules 5a, 5b, 6 mutually convert a high-frequency band signal handled at the first antenna 2 and the second antennas 3 and a base band signal handled at the BB module 4. In addition, the BB module 4 modulates a data (a transmitted data and a received data) handled at a network side to the base band signal, and demodulates the base band signal to the data handled at the network side.

In the distributed antenna system 1, the RF modules 5a, 5b, 6 located at each place are connected to one BB module 4 intensively, thus distance between the RF modules 5a, 5b, 6 and the BB module 4 inevitably becomes long. Consequently, it is preferable that the RF modules 5a, 5b, 6 and the BB module 4 are connected to each other by an optical fiber 7. By this means, even if the RF modules 5a, 5b, 6 and the BB module 4 are distantly-positioned, the communication can be carried out without deterioration of signal.

Next, operation of the distributed antenna system 1 will be explained.

In a mobile communication system using the distributed antenna system 1, consideration is carried out about such a case that a communication is carried out at a mobile terminal $M_1$ located within a predetermined communication range S. The mobile terminal $M_1$ is included in the communication range of the second antenna 3a, and simultaneously is included in the communication range of the first antenna 2.

Figure 2:
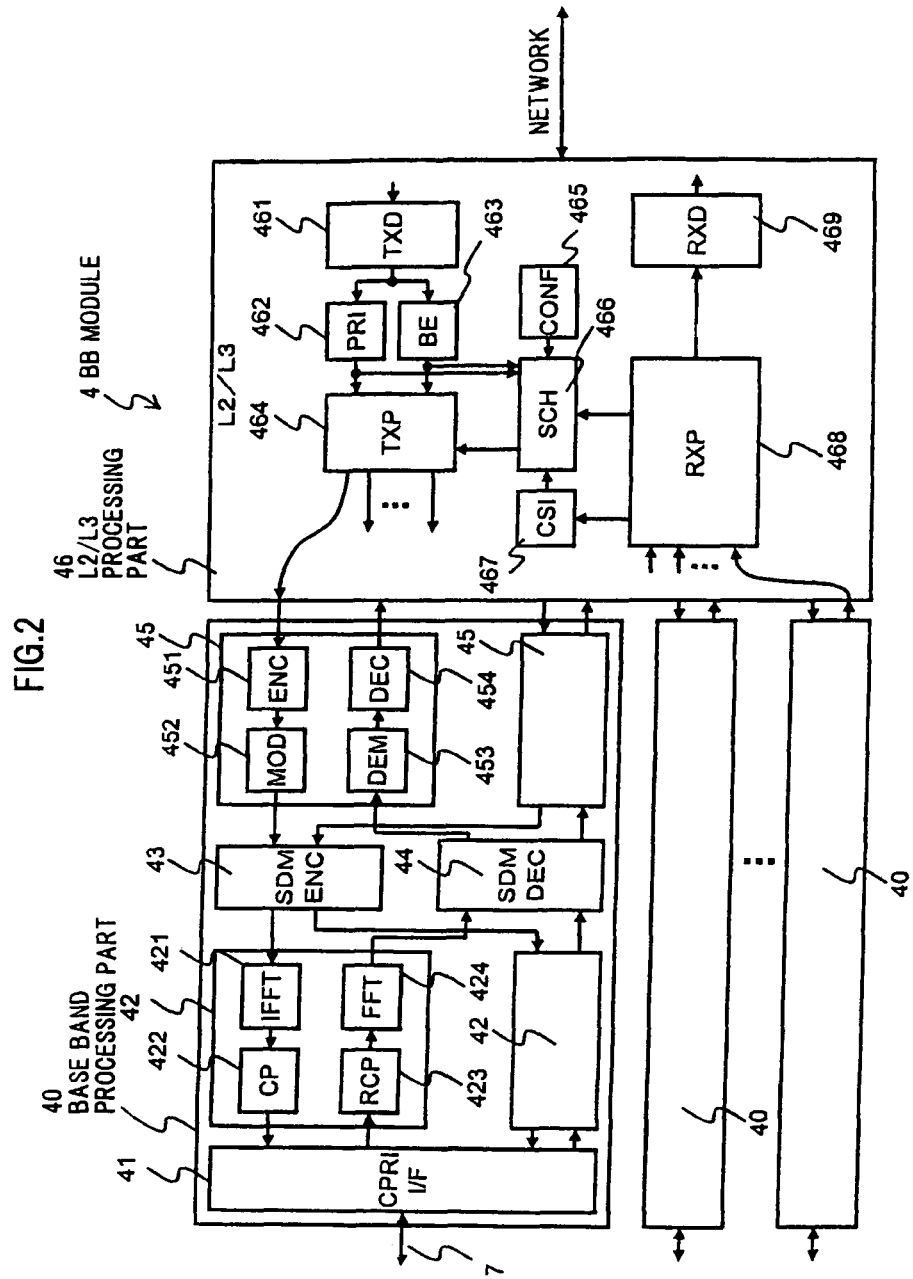
FIG. 2 is an explanatory view schematically showing a BB module used in the one embodiment of the present invention.
Figure 3:
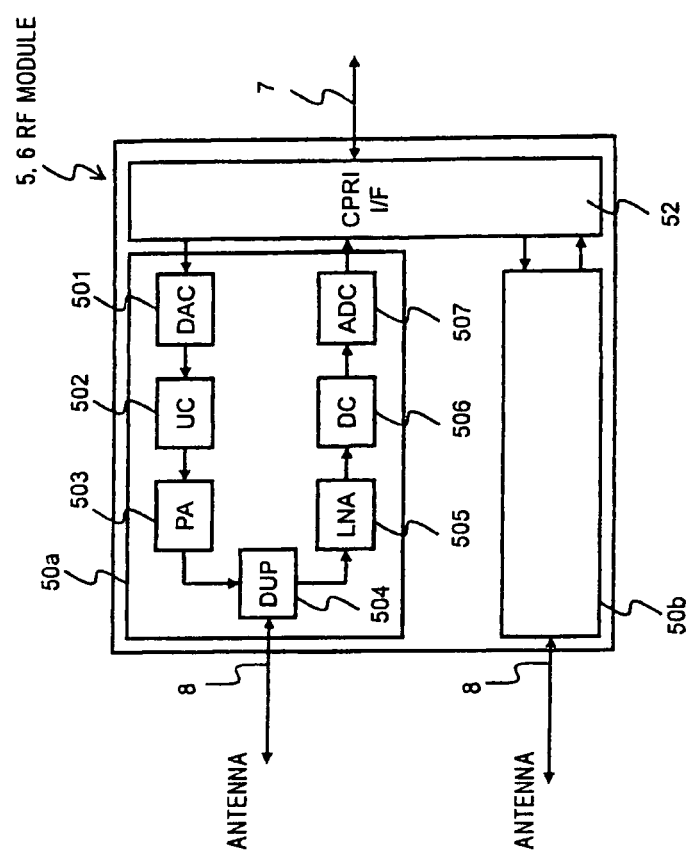
FIG. 3 is an explanatory view schematically showing a RF module used in the one embodiment of the present invention.
Figure 4:
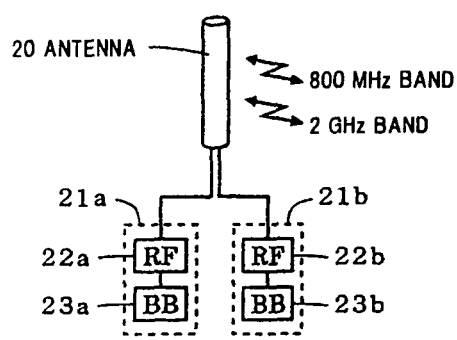
FIG. 4 is a conceptual view schematically showing a conventional mobile communication system.

In this case, the mobile terminal $M_1$ carries out a communication by means of the carrier aggregation using the first antenna 2 and the second antenna 3a. Referring to FIGS. 2 and 3, configurations and operating procedures of the BB module 4 of the base station B and the RF modules 5, 6 will be explained. Here, a configuration and an operating procedure in case that Multiple-Input Multiple-Output (MIMO) system of 2 streams is used as a spatial multiplex system and an Orthogonal Frequency Division Multiplexing (OFDM) system is used as a modulation system are shown. Further, it is possible to change the use or nonuse of the MIMO system and the stream number of the MIMO system. In addition, it is also possible to use another modulation system.

FIG. 2 is an explanatory view schematically showing the BB module 4 used in the one embodiment of the present invention. In addition, FIG. 3 is an explanatory view schematically showing the RF module 5, 6 used in the one embodiment of the present invention. As shown in FIG. 2, the BB module 4 has a L2/L3 processing part 46 and plural base band processing parts 40 connected to the L2/L3 processing part 46 in parallel.

As to a transmitting system, the L2/L3 processing part 46 has a transmitting processing part 464 that outputs a transmitted data input from a network side of a communication carrier to the base band processing part 40 selected from the plural base band processing parts 40 based on communication conditions. The communication conditions include, for example, priority of the transmitted data, the number of the second antenna 3, the number of the RF modules 5, 6, and information of frequency band corresponding to the first antenna 2, the second antenna 3 and the RF modules 5, 6. The L2/L3 processing part 46 determines a frequency band at which the transmitted date is sent, an antenna, an encoding ratio and a modulation system based on the above-mentioned communication conditions, and sends the data to the plural base band processing parts 40. In addition, in case that the data previously transmitted did not reach the mobile terminal, the L2/L3 processing part 46 can also carry out a resending control based on information that the data could not be properly transmitted (or received). In addition, the plural base band processing parts 40 have a function of modulating the transmitted data input from the L2/L3 processing part 46 and transmitting to the RF modules 5, 6 as a base band signal via Common Public Radio Interface (CPRI) interface 41. The plural base band processing parts 40 are respectively connected to the optical fiber 7. The base band processing parts 40 are installed so as to be the same in number as the RF modules 5, 6 to which the BB module 4 is connected.

On the other hand, as to a receiving system, the plural base band processing parts 40 demodulate the base band signal transmitted from the RF modules 5, 6 via CPRI interface 41 and convert to a received data. The L2/L3 processing part 46 has a receiving processing part 468 that obtains information of channel from the received data input from the plural base band processing parts 40, and simultaneously transmits the received data to the network side. In addition, the L2/L3 processing part 46 can also determine if the received data that was received could be properly received and obtain information showing whether the data previously transmitted could be properly received or not. Further, the information of channel obtained from the received data can be used as a communication condition in the transmitting system.

First, as to the transmitting system, an operation of the L2/L3 processing part 46 will be explained in detail. The transmitted data input to the BB module 4 is input to the L2/L3 processing part 46. The L2/L3 processing part 46 is equipped with a transmitted data buffer 461, the transmitting processing part 464, a base station configuration information 465, a scheduler 466, a channel information 467, the receiving processing part 468 and a receiving data buffer 469.

The transmitted data buffer 461 saves the transmitted data that is input, and classifies in accordance with the priority of the data. In the embodiment, the transmitted data buffer 461 classifies the transmitted data into a priority data 462 such as voice that is needed to be low-delay and a best effort data 463 that is not so severe to the delay, and transmits to the transmitting processing part 464. At the same time, the transmitted data buffer 461 transmits information of a type of the transmitted data and a mobile terminal as a destination to the scheduler 466.

The scheduler 466 determines the antenna and RF modules from which the transmitted data should be transmitted, based on the three communication conditions of the base station configuration information 465 in which the number of the antenna and RF modules and information of the frequency band corresponding to the antenna and the RF modules are stored, the channel information 467 in which information of the channel obtained from the received data is stored, and the above-mentioned priority of the transmitted data. The transmitting processing part 464 determines a frequency band at which the transmitted date is sent, an antenna, an encoding ratio and a modulation system based on the determination in the scheduler 466, and distributes the transmitted data so as to transmit to the base band processing parts 40 respectively. For example, when throughput needed for a certain mobile terminal is large, if plural frequencies are available between the base station and the mobile terminal, the transmitting processing part 464 assigns the transmitted data to plural frequency bands. In this case, the L2/L3 processing part 46 selects plural base band processing parts 40 connected to the RF modules 5, 6 corresponding to different frequency so as to transmit the transmitted data to the mobile terminal. Here, the channel information 467 includes, for example, information of an antenna (for example, the second antenna 3) with which the mobile terminal is capable of communicating, and the RF module (for example, RF module 6) connected thereto, and information of channel at the frequency band corresponding thereto.

The transmitted data sent from the L2/L3 processing part 46 is input to a modulation and demodulation part 45 of the base band processing parts 40. The modulation and demodulation part 45 has an error correction encoding part 451 and a modulation part 452, error correction-encodes the input data at the error correction encoding part 451 and simultaneously modulates the error correction-encoded data at the modulation part 452 so as to output to a Spacial Division Multiplexing (SDM) conversion part 43. As a modulation method in the modulation part 452, for example, Quadrature Phase Shift Keying (QPSK) and 16 Quadrature Amplitude Modulation (16 QAM) can be used. Further, two modulation and demodulation parts 45 are installed per one base band processing parts 40, and the above-mentioned data processing is carried out at each of the modulation and demodulation parts 45.

The SDM conversion part 43 converts and synthesizes amplitudes and phases of two signals input from the two modulation and demodulation parts 45 of the one base band processing parts 40 in order to carry out the MIMO transmission, and generates new two signals. The SDM conversion part 43 outputs the two signals generated to two OFDM processing parts 42 respectively. Each of the OFDM processing parts 42 has a IFFT processing part 421 and a cyclic prefix adding part 422, transforms the input data by IFFT (inverse fast Fourier transform) at the IFFT processing part 421, and simultaneously adds cyclic prefixes at the cyclic prefix adding part 422, so as to output to the CPRI interface 41. The CPRI interface 41 serializes the signal input from the two OFDM processing parts 42 so as to transmit to the RF modules 5 (5a, 5b), 6 via the optical fiber 7.

The RF modules 5, 6 has a CPRI interface 52 connected to the optical fiber 7 and plural RF parts 50 connected to the CPRI interface 52 in parallel. The CPRI interface 52 converts the base band signal transmitted from the BB module 4 via the optical fiber 7 into electrical signals, and then sorts into a signal for a first RF part 50a and a signal for a second RF part 50b. The first RF part 50a converts the sorted electrical signal into an analogue signal by a digital/analogue converter 501, and converts into a high-frequency signal by an up-converter 502. In addition, the first RF part 50a amplifies the high-frequency signal by a power amplifier 503 so as to transmit from the antenna via a duplexer 504 and the coaxial cable 8. Here, only the operation of the first RF part 50a has been explained, but the second RF part 50b operates similarly to the first RF part 50a.

Next, the receiving system will be explained. The high-frequency signal received by the antenna is input to the first RF part 50a via the coaxial cable 8 and the duplexer 504. The first RF part 50a amplifies the input high-frequency signal by a low noise amplifier 505, so as to convert to a base band signal by a down-converter 506. The first RF part 50a converts the base band signal to a digital signal by an analogue/digital converter 507, so as to output to the CPRI interface 52. The CPRI interface 52 transmits the base band signal converted to the digital signal to the BB module 4 via the optical fiber 7. Thus, a bidirectional serial communication is carried out between the CPRI interface 52 of the RF modules 5, 6 and the CPRI interface 41 on the part of the BB module 4 via the optical fiber 7.

The CPRI interface 41 parallelizes the base band signal sent from the RF modules 5, 6 so as to output to the two OFDM processing parts 42. Each of the OFDM processing parts 42 has a cyclic prefix removing part 423 and a FFT processing part 424, and after removing the cyclic prefix of the input data by the cyclic prefix removing part 423, carries out the FFT (fast Fourier transform) by the FFT processing part 424, so as to output to a SDM decoding part 44. In case of the 2 streams MIMO, the signals received at the different antenna are also output from the OFDM processing parts 42 to the SDM decoding part 44. The decoding part 44 MIMO-decodes the plural signals so as to output to the modulation and demodulation part 45. The modulation and demodulation part 45 has a demodulation part 453 and an error correction processing part 454, and converts the input data to a binary data by the demodulation part 453 and simultaneously error-corrects by the error correction processing part 454 so as to output to the L2/L3 processing part 46.

The L2/L3 processing part 46 transmits the received data input from plural base band processing parts 40 to the receiving processing part 468. The receiving processing part 468 determines if the received data input could be properly received, obtains information showing that the transmitted data previously sent could be properly received by the mobile terminal or not, and obtains information of the channel. The information of the channel is saved in the channel information 467. In case that the receiving processing part 468 determined that the received data could not be properly received, it generates a data for informing the mobile terminal about not being properly received, so as to transmit through the scheduler 466. On the other hand, in case that the receiving processing part 468 determined that the received data could be properly received, it generates a data for informing the mobile terminal about being properly received so as to transmit through the scheduler 466, and simultaneously stores the received data in receiving data buffer 469 so as to transmit to the network side of the communication carrier. In addition, the receiving processing part 468 obtains information showing that the transmitted data previously sent was properly received by the mobile terminal or not, and in case that information showing about being properly received has been obtained, it informs the scheduler 466 about transmission completion of the corresponding transmitted data. On the other hand, in case that the transmitted data was not properly received by the mobile terminal, the receiving processing part 468 informs the scheduler 466 about requisition for retransmission of the corresponding transmitted data.

The distributed antenna system 1 according to the invention realizes a communication by means of the carrier aggregation due to the above-mentioned operations of the BB module 4 and the RF modules 5, 6.

Also, in case that a communication is carried out by the mobile terminal $M_2$ located within a predetermined communication range S, a communication by means of the carrier aggregation is carried out by using the second antenna 3b and the first antenna 2 that cover a communication range of low-frequency band in which the mobile terminal $M_2$ included.

Namely, if it is located within the predetermined communication range S, the communication by means of the carrier aggregation can be carried out at any place.

As described above, in short, the distributed antenna system 1 according to the invention has a configuration that the first antenna 2 and the second antennas 3 disposed at each place are intensively connected to the one BB module 4 via the RF modules 5a, 5b, 6, thus the base band signal from each of the antennas is collectively processed by the one BB module 4. Thereby, in the distributed antenna system 1, plural frequency bands can be used at the same time, and communications by means of the carrier aggregation can be performed.

In addition, the distributed antenna system 1 can be realized by modifying existing equipments, in particular, by modifying at least the L2/L3 processing part of the BB module. The circuit configuration in the base band processing part can be configured similarly to the conventional one, thus even if the BB module itself is replaced, increase in production cost can be reduced. Consequently, the distributed antenna system 1 of the invention can utilize existing systems, so as to respond to the carrier aggregation at low cost.

In addition, the distributed antenna system 1 has a configuration that plural antennas for high-frequency band are disposed so as to cover a communication range of the antenna for low-frequency band, thereby aggregation of frequencies, namely carrier aggregation can be effectively realized at all the frequency bands, and throughput of users can be enhanced.

Further, in the embodiment, examples that two frequency bands of 800 MHz band as low-frequency band and 2 GHz band as high-frequency band are used at the same time have been explained, but not limited to this, the invention can be also applied to carrier aggregation using not less than three different frequency bands.

In this case, it is preferable that the distributed antenna system has a configuration that the lowest frequency band is defined as a low-frequency band, and antennas for each of high-frequency bands (for example, 1.7 GHz band and 2 GHz band) are disposed so as to cover the communication range of the low-frequency band.

In doing this way, carrier aggregation using not less than three frequency bands can be realized while existing equipments are utilized.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A distributed antenna system, comprising: a first antenna disposed covering a predetermined communication range, the first antenna carrying out a communication at least at a low-frequency band; and a plurality of second antennas disposed covering the predetermined communication range, the plurality of second antennas carrying out a communication at a high-frequency band, wherein the distributed antenna system is operable to carry out a communication between the first antenna and the plurality of second antennas, and a mobile terminal located within the predetermined communication range by means of carrier aggregation using the low-frequency band and the high-frequency band, and the distributed antenna system further comprises a Base Band (BB) module equipped in a base station for carrying out a communication within the predetermined communication range, the first antenna and the plurality of second antennas being each connected to the one BB module via an RF module; wherein the communication condition includes at least one selected from a priority of the transmission data, the number of the plurality of second antennas, the number of the RF module, information of a frequency band corresponding to the first antenna, the plurality of second antennas and the RF module, information of an antenna with which the mobile terminal is capable of communicating and the RF module connected to the antenna, and information of a channel at the corresponding frequency band.

2. The distributed antenna system according to claim 1, wherein the RF module and the BB module are connected to each other by an optical fiber.

3. The distributed antenna system according to claim 1, wherein the communication by means of the carrier aggregation is carried out such that the BB module collectively processes signals of the low-frequency band and the high-frequency band.

4. The distributed antenna system according to claim 1, wherein the BB module comprises a L2/L3 processing part and a plurality of base band processing parts parallel connected to the L2/L3 processing part, the L2/L3 processing part outputs a transmitted data inputted thereto to a base band processing part selected from the plurality of base band processing parts based on a communication condition, and the selected base band processing part modulates the transmitted data inputted from the L2/L3 processing part, and transmits the modulated transmitted data as a base band signal to the RF module.

5. The distributed antenna system according to claim 4, wherein the number of the plurality of base band processing parts is the same as or more than the number of the RF module connected to the BB module.

6. The distributed antenna system according to claim 4, wherein the L2/L3 processing part transmits the transmitted data to the mobile terminal by using the plurality of base band processing parts connected to the RF module corresponding to a different frequency.

* * * * *